(12) United States Patent
Buwalda

(10) Patent No.: US 8,775,558 B1
(45) Date of Patent: Jul. 8, 2014

(54) DEVICE AND METHOD FOR AUTOMATION VIA IMAGE-BASED USER INTERFACES

(75) Inventor: Hans Buwalda, Mountain View, CA (US)

(73) Assignee: Logigear Corporation, San Mateo, CA (US)

(*) Notice: Subject to any disclaimer, the term of this patent is extended or adjusted under 35 U.S.C. 154(b) by 0 days.

(21) Appl. No.: 13/304,649

(22) Filed: Nov. 26, 2011

(51) Int. Cl.
G06F 15/16 (2006.01)
G06F 13/10 (2006.01)
G06F 9/54 (2006.01)

(52) U.S. Cl.
CPC .................. *G06F 13/107* (2013.01); *G06F 9/548* (2013.01)
USPC ....................................................... 709/217

(58) Field of Classification Search
CPC . H04L 67/34; H04L 41/0823; H04L 41/0886; G06F 9/44505; G06F 9/548; G06F 13/107
USPC ....................................................... 709/217
See application file for complete search history.

(56) References Cited

U.S. PATENT DOCUMENTS

| | | | | |
|---|---|---|---|---|
| 7,149,625 B2* | 12/2006 | Mathews et al. | | 701/420 |
| 7,424,543 B2* | 9/2008 | Rice, III | | 709/229 |
| 7,953,849 B2* | 5/2011 | Hermes et al. | | 709/224 |
| 8,015,232 B2* | 9/2011 | Vigil et al. | | 709/200 |
| 8,051,381 B2* | 11/2011 | Ebrom et al. | | 715/762 |
| 8,290,971 B2* | 10/2012 | Klawitter et al. | | 707/758 |
| 8,364,845 B2* | 1/2013 | Richter | | 709/244 |
| 2004/0019542 A1* | 1/2004 | Fuchs et al. | | 705/32 |
| 2005/0289524 A1* | 12/2005 | McGinnes | | 717/140 |
| 2007/0136788 A1* | 6/2007 | Monahan et al. | | 726/3 |
| 2010/0076993 A1* | 3/2010 | Klawitter et al. | | 707/769 |
| 2011/0064312 A1* | 3/2011 | Janky et al. | | 382/195 |
| 2012/0017000 A1* | 1/2012 | Lim | | 709/229 |
| 2012/0108340 A1* | 5/2012 | Ashida et al. | | 463/39 |
| 2013/0103749 A1* | 4/2013 | Werth et al. | | 709/203 |
| 2013/0103841 A1* | 4/2013 | Werth et al. | | 709/227 |
| 2013/0103973 A1* | 4/2013 | Werth et al. | | 714/2 |

* cited by examiner

*Primary Examiner* — Kristie Shingles
(74) *Attorney, Agent, or Firm* — Perkins Coie LLP; Aaron Wininger

(57) ABSTRACT

An apparatus, method and software enable automation in thin client and black box applications. In particular, test scripts can be run automatically in these applications.

14 Claims, 5 Drawing Sheets

DEVICE AND METHOD FOR AUTOMATION VIA IMAGE-BASED USER INTERFACES

FIELD OF THE INVENTION

At least one embodiment of the present invention pertains to automation, and more particularly, to a system and method for automation via image-based user interfaces using reference information.

BACKGROUND

Automation is a wide field of tools and methods, where one computerized system, referred to as an "automation system", interacts with another computerized system, referred to as a "target system". Automation is often used for testing, but it can also be used for other purposes like carrying out repetitive tasks like data entry, support of training, and helping disabled users.

However, in remote access applications, which use image-based user interfaces, there is a lack of automation systems.

SUMMARY

An apparatus, method and software enable automation in thin client and black box applications. In particular, test scripts can be run automatically in these applications.

In an embodiment, a method implemented in a first device comprises storing reference information in a memory device; the reference information including location and dimensions of a control at a second device; running an automation on a thin client on the first device, the automation including inputs to the thin client based on the reference information and a script; and transmitting the automation from the thin client to an application on the second device, the application corresponding with the thin client. Other embodiments include a corresponding software and apparatus.

In another embodiment, a method implemented in a first device comprises collecting reference information from an emulator on the first device, the reference information including location and dimensions of a control on the emulator corresponding with a second device; and transmitting an automation from the first device to a second device, the automation including an input to the second device based on the reference information and a script.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Embodiments of the invention consider the interactions via a user interface of a target system, specifically the emulation of user input operations by an automation, and the capturing of information from the user interface, like content and properties of user controls being displayed by the target system.

To effectively perform user operations and collect information an automation collects specific information, like the location of controls, and their content and properties. From the perspective of the automation system there are essentially two ways interaction via the user interface of a target system can take place—"object based" and "image based":

In the object based approach the automation system can obtain and use information from the user interface itself about where controls are located and what their contents or properties are. It can usually also enter data and per-form operations via other more efficient methods emulation of the input devices available to human user In the image based approach the automation regards the user interface as an image, of which it can only access the pixels, and for which the only means of input is emulated user interaction Embodiments of the invention address situations where there are two related user interfaces, one of which facilitates some form of object based access by an automation system, while the other enables access with the image based approach. Two common examples of this situation are (1) remote access, and (2) a reference device.

Figure 1:
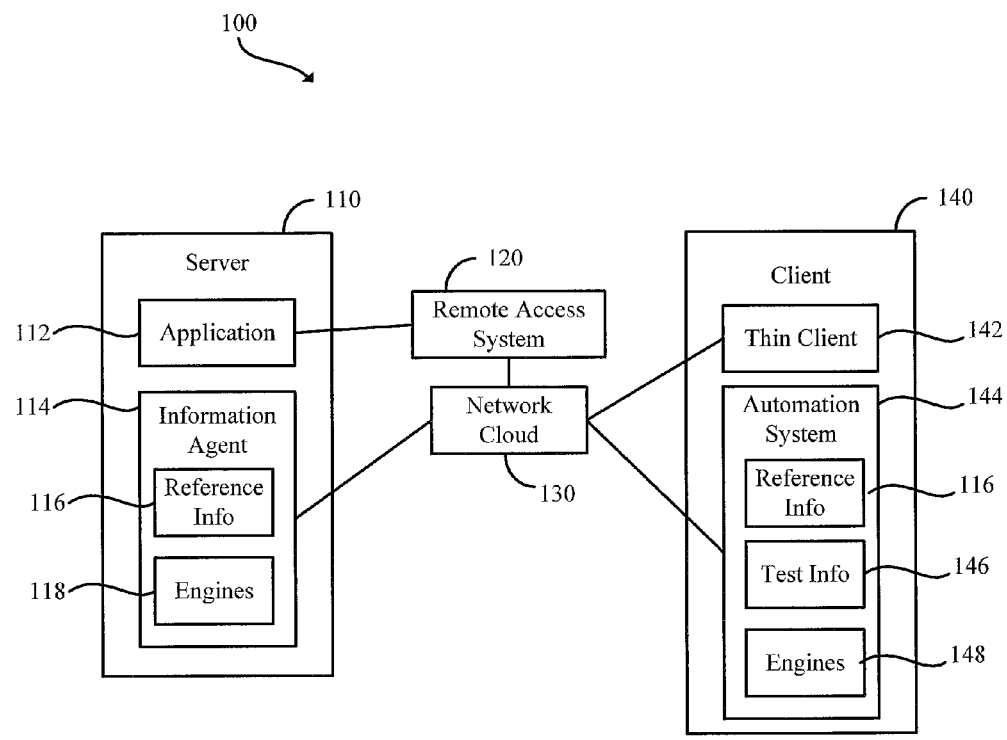
FIG. 1 shows a network according to an embodiment of the invention.

FIG. 1 shows a network 100 according to an embodiment of the invention. Network 100 refers to the remote access situation. The network 100 includes a server 110, a remote access system 120, and a client 140, all of which are communicatively coupled to a network 130. The remote access system 120 can also be communicatively coupled to the server 110 or instead be a part of the server 110. Note that the server 110 may comprise one or multiple devices but is shown as a single device for ease of illustration.

The network 130 can be, for example, a local area network (LAN), wide area network (WAN), metropolitan area network (MAN), global area network such as the Internet, a Fibre Channel fabric, or any combination of such interconnects. Each of the server 110, the remote access system 120, and the client 140 may be, for example, a conventional personal computer (PC), server-class computer, workstation, handheld computing/communication device, or the like.

The server 110 includes an application 112 and an information agent 114. The application can be any program, e.g., a word processor. The information agent 114 uses engines 118 to generate reference information ("info") 116, which is then transmitted via the network 130 to the client 140. The reference info 116, as will be discussed further below in conjunction with FIG. 3, includes data on the position of command elements in a graphical user interface ("GUI") of the application 112. Command elements may include buttons, menus, etc. The engines 118 will be discussed in further detail below in conjunction with FIG. 4.

The remote access system 120, when the application 112 is running, produces a copy of the GUI in approximate real time and transmits it to the client 140. The client 140 includes a thin client 142 and an automation system 144. The client 140 received the GUI copy and displays it on a screen of the client 140. Any interaction by a user with the GUI copy is transmitted by the remote access system 120 to the server 110 so that the interaction occurs on the actual application 112. For example, if the GUI is currently displaying a button, the remote access system 120 will transmit an image with the button to the thin client 142. If a user then clicks the button display on a screen of the client 140, the remote access system 120 will cause the button to be clicked on the application 112 running on the server 110.

The automation system 144 includes the reference info 116 received from the server 110, test info 146 and engines 148. The engines 148, as will be discussed in further detail below in conjunction with FIG. 5, can run operations on the thin client 142 using the reference info 116 to cause operations to occur on the application 112.

Figure 2:
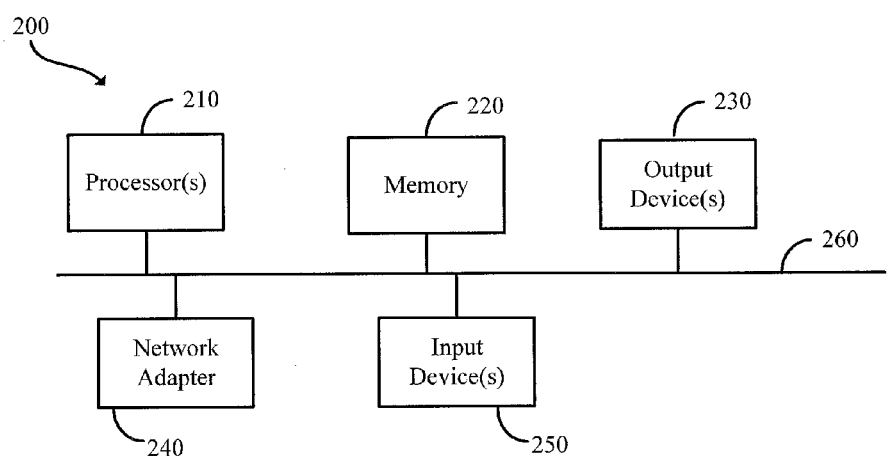
FIG. 2 is a high-level extent diagram showing an example of architecture of a client or server of FIG. 1.

FIG. 2 is a high-level extent diagram showing an example of an architecture 200 of the client 140 or the server 110 of FIG. 1. The architecture 200 includes one or more processors 210 and memory 220 coupled to an interconnect 260. The interconnect 260 shown in FIG. 2 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire", and/or any other suitable form of physical connection.

The processor(s) 210 is/are the central processing unit (CPU) of the architecture 200 and, thus, control the overall operation of the architecture 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the architecture 200. The memory 220 represents any form of random access memory (RAM), read-only memory (ROM), flash memory, or the like, or a combination of such devices. In use, the memory 220 may contain, among other things, software or firmware code for use in implementing at least some of the embodiments of the invention introduced herein.

Also connected to the processor(s) 210 through the interconnect 260 is a communications interface 240, such as, but not limited to, a network adapter, one or more output device(s) 230 and one or more input device(s) 250. The network adapter 240 provides the architecture 200 with the ability to communicate with remote devices over the interconnect network 130 and may be, for example, an Ethernet adapter or Fibre Channel adapter. The input device 250 may include a touch screen, keyboard, and/or mouse, etc. The output device 230 may include a screen and/or speakers, etc.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Figure 3:
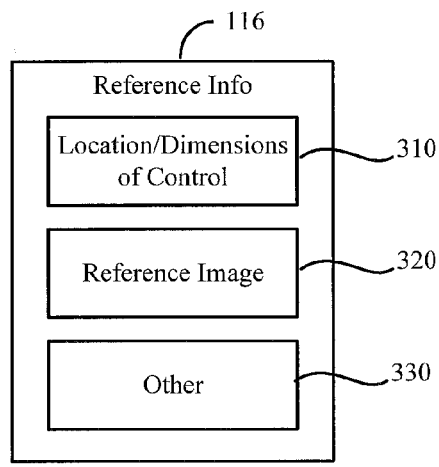
FIG. 3 is a block diagram showing elements of reference information.

FIG. 3 is a block diagram showing elements of reference information 116. The reference information 116 includes location and/or dimensions of controls (e.g., buttons, menus, etc.) 310 (hereinafter control data 310) of the application 112, optionally a reference image(s) 320 of the application 112, and optionally other data 330 pertaining to control.

Figure 4:
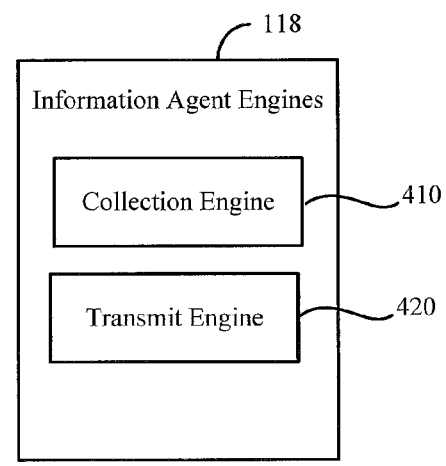
FIG. 4 is a block diagram showing elements of information agent engines.

FIG. 4 is a block diagram showing elements of information agent engines 118. The engines 118 (logic) include a collection engine (logic) 410 and a transmit engine (logic) 420. The collection engine 410 collects the control data 310, the reference image 320, and the other data 330 from the application 112. For example, for Java a Java Virtual Machine can add a library to the application under test 112. The code in this library can interact with the windows and controls of the application 112. It can see properties, including its position on the screen and its displayed image. Similar techniques are available for other platforms like Microsoft .Net and WPF. In determining locations and dimensions, and in comparing images, the automation will compensate for differences in resolution, pixel depth, and any possible other graphical differences that are not significant for the meaning of the information sought.

Figure 5:
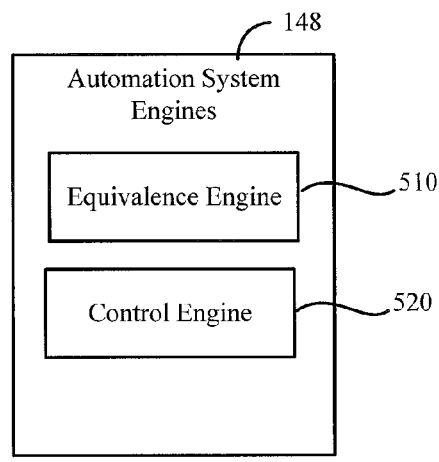
FIG. 5 is a block diagram showing elements of automation system engines.

FIG. 5 is a block diagram showing elements of the automation system engines (logic) 148. The engines 148 include an equivalence engine (logic) 510 and a control engine (logic) 520. The equivalence engine 510 uses the control data 310 and the reference image 320 to determine if a display of the application on the client 140 is equivalent to the control in the reference interface. That is, the equivalence engine 510, in an embodiment, compares the image of a control coming from the server 110 via the remote access system 120 with what is being displayed on the client 140. Equivalence occurs when the displayed image of the control is similar enough to its image on the server. Normally this is the case when the images are equal, but it can happen that the displayed image differs, due to factors like compression or different characteristics of the display device. The equivalence engine 510 may use one or more picture comparison algorithms, such as Peak Signal-to-Noise Ratio (PSNR) and Structural Similarity (SSIM), to determine equivalence.

If the representation of the application is equivalent, the control engine 520 will use the remaining information (location, dimension, any information the collection engine 410 wants to retrieve) to control the application 112. This information can be used to perform an operation. An example operation may include clicking a button in the application or collecting information from a control like a textbox or list, and verifying it against expected values.

Figure 6:
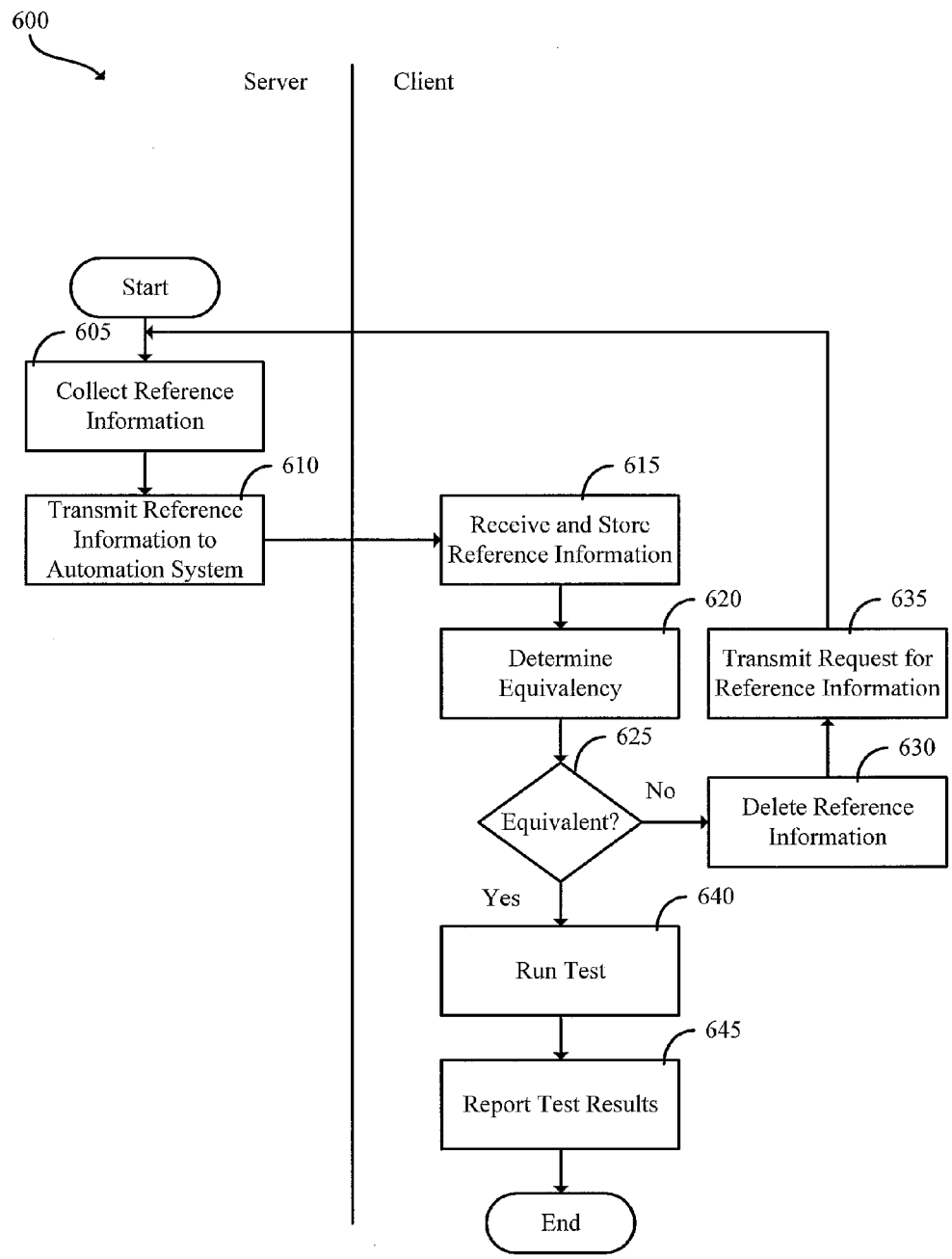
FIG. 6 illustrates an automation technique according to an embodiment of the invention.

If the thin client 142 is not displaying an image of the application 112 on a display of the client 140 the think client 142 will wait and retry a number of times, using a preset wait interval and a preset maximum amount of wait time. After the wait time is exceeded, the automation will treat the situation as an error situation FIG. 6 illustrates an automation technique 600 according to an embodiment of the invention. First, the collection engine 410 collects (605) reference information 116 and transmits (610) the reference information 116 to the automation system 144 on the client 140. The automation system 144 receives (615) and stores (615) the reference information 116. The equivalence engine 510 then determines (620) equivalence of the reference image 320 is equivalent with the control data 310. If (625) not equivalent enough, the automation system 144 deletes (630) the stored reference information 116 and reports it as an error. Alternatively, the automation system 144 can transmit (635) a request for reference information and repeat from collecting (605).

If (625) equivalent enough, the control engine 520 runs (640) the application 112 automatically through the thin client 142 using test info 146. In an embodiment, the running (640) performs only one action at a time. Note that the running (640) can include testing the thin client 142 and client 112 automatically and/or other automated tasks. Operations and/or verifications for controls are performed with the thin client 142, which are then transmitted to the application 112. If the running (640) includes a test, then the control engine 520 reports (645) test results. The technique 600 then ends.

Figure 7:
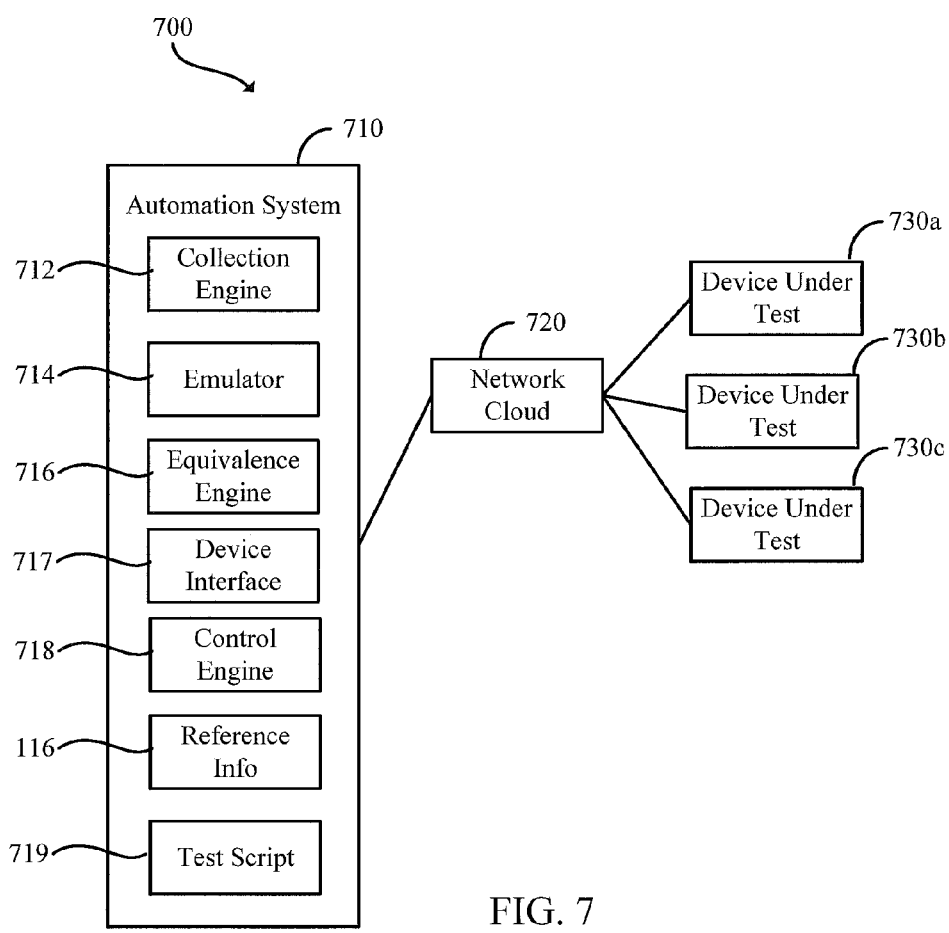
FIG. 7 shows a network according to an embodiment of the invention.

FIG. 7 shows a network 700 according to an embodiment of the invention. The network 700 refers to the reference device situation. The network 700 includes an automation system 710 coupled to a network cloud 720, which in turn is coupled to devices under test 730a, 730b, and 730c. Note that additional or fewer devices 730 can be part of the network 700. Examples of the devices 730 include, but are not limited to, smart-phones, tablet computers and industrial or diagnostic equipment. Note that the automation system 710 may comprise one or multiple devices but is shown as a single device for ease of illustration.

The network 700 can include a "black box" environment wherein devices 730 may be located at a third party's location and network-enabled access to the devices 730 (e.g., via robotic manipulation) is rented out to developers to test the devices. Accordingly, developers would not need to actually purchase devices 730 in order to test compatibility of software on the devices 730. Instead, developers, at any location with network 720 access, can rent use of the devices 730 via the network 720.

During the operation of the network 700, reference information will be collected in a "reference run". The automation system 710 will run an automation script, a set of instructions for automated interaction, on an emulator, which allows more access to user interface elements then the devices 730 may do. In addition to carrying out the automation instructions the automation system 710 will collect the reference information. This information is then used to support subsequent runs on one or more physical devices 730 allowing the automation system 710 to interact with the image based access, as if it had object based access.

The network 700 can be, for example, a local area network (LAN), wide area network (WAN), metropolitan area network (MAN), global area network such as the Internet, a Fiber Channel fabric, or any combination of such interconnects. Each of the server system 710 and devices under test 730 may be, for example, a conventional personal computer (PC), server-class computer, workstation, handheld computing/communication device, or the like.

The automation system 710 includes a collection engine (logic) 712, an emulator (logic) 714, an equivalence engine (logic) 716, a control engine (logic) 718, reference info 116 generated by the collection engine 712, and a test script 719. The automation system 710 also includes an interface 717 to the devices under test 730, which may comprise a connection for development and testing purposes provided by the device manufacturer or vendor, or it may be part of the "black box" services as described above.

The collection engine 712 is substantially similar to the collection engine 410 but instead operates on the emulator 714. That is, the collection engine 712 generates the reference info 116 based on the emulator 714. The emulator 714 emulates one or more of the devices 730. The equivalence engine 716 is substantially similar to the equivalence engine 510 and determines the equivalence of the originally captured image of a UI element on the emulator 714 and an image of the same UI element on the device under test 730. The control engine 718 operates, via the interface 717, a device 730 using the test script 719 and reference info 116.

For example, a test may include clicking a button in the application or collecting information from a control like a textbox or list, and verifying it against expected values.

Figure 8:
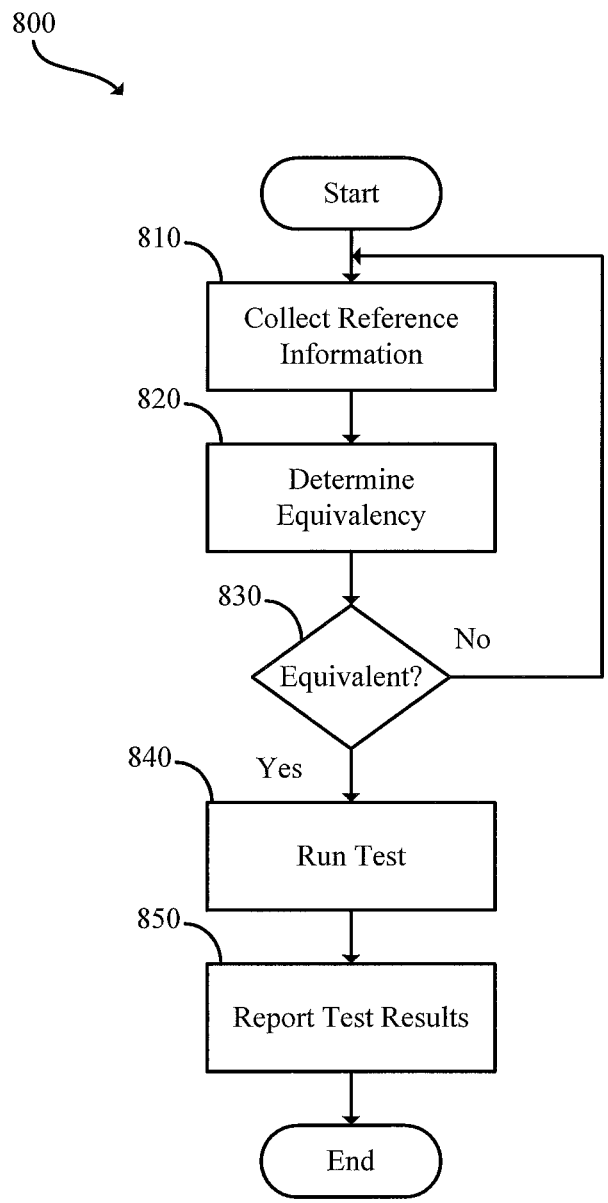
FIG. 8 illustrates an automation technique according to an embodiment of the invention.

FIG. 8 illustrates an automation technique 800 according to an embodiment of the invention. First, the collection engine 712 collects (810) and stores reference information of the emulator 714 in a reference run. The equivalence engine 716 then determines (820) equivalency between an image captured of a UI element in the reference run on the emulator 714 and the image captured on the device under test 730. If (830) equivalence is not sufficient, then an error for the automation is reported. Alternatively, the collecting (810) can be repeated. If (830) equivalence is sufficient, then the control engine 718, using the test script 719, runs (840) an automated test step on the device 730. The control engine 718 then reports (850) the results of the test or automation run. The technique 800 then ends.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method implemented in a first device, comprising:
  storing reference information in a memory device; the reference information including location and dimensions of a control at a second device;

running an automation on a thin client on the first device, the automation including inputs to the thin client based on the reference information and a script; and transmitting the automation from the thin client to an application on the second device, the application corresponding with the thin client.

2. The method of claim 1, wherein the automation includes a test and the method further comprises reporting test results.

3. The method of claim 1, further comprising determining if there is sufficient equivalence between an image of a UI element shown by the second device and an image of that UI element shown by the first device.

4. The method of claim 3, wherein the equivalence is determined using a picture comparison algorithm.

5. A first device comprising:
a processor;
a communication interface, coupled to the processor, through which to receive from a second device, reference information, the reference information including location and dimensions of a control at the second device; and
a memory containing code which, when executed by the processor, causes the first device to perform steps that include
running an automation on a thin client on the first device, the automation including inputs to the thin client based on the reference information and a script; and
transmitting the automation from the thin client to an application on the second device, the application corresponding with the thin client.

6. The first device of claim 5, wherein the automation includes a test and the steps further comprises reporting test results.

7. The first device of claim 5, wherein the steps further comprise determining if there is sufficient equivalence between an image of a UI element shown by the second device and an image of that UI element shown by the first device.

8. The first device of claim 7, wherein the equivalence is determined using a picture comparison algorithm.

9. A method implemented in a first device, comprising:
collecting reference information from an emulator on the first device, the reference information including location and dimensions of a control on the emulator corresponding with a second device; and
transmitting an automation from the first device to a second device, the automation including an input to the second device based on the reference information and a script.

10. The method of claim 9, wherein the automation includes a test and the method further comprises reporting test results.

11. The method of claim 9, further comprising determining if there is sufficient equivalence between an image of a UI element on the first device and an image of that UI element on the second device.

12. A first device, comprising:
a processor;
a communication interface, coupled to the processor; and
a memory containing an emulator and code which, when executed by the processor, causes the first device to perform steps that include
collecting reference information from an emulator on the first device, the reference information including location and dimensions of a control on the emulator corresponding with a second device; and
transmitting, via the communication interface, an automation from the first device to a second device, the automation including an input to the second device based on the reference information and a script.

13. The first device of claim 12, wherein the automation includes a test and the method further comprises reporting test results.

14. The first device of claim 12, further comprising determining if there is sufficient equivalence between an image of a UI element on the first device and an image of that UI element on the second device.

* * * * *